(12) United States Patent
Lv et al.

(10) Patent No.: US 8,556,229 B2
(45) Date of Patent: Oct. 15, 2013

(54) ELECTRONIC EXPANSION VALVE

(75) Inventors: Ming Lv, Zhejiang Province (CN); Caiyi Zhan, Zhejiang Province (CN)

(73) Assignee: Zhejiang Sanhua Co., Ltd., Xinchang County, Zhejiang Province (CN)

(*) Notice: Subject to any disclaimer, the term of this patent is extended or adjusted under 35 U.S.C. 154(b) by 305 days.

(21) Appl. No.: 12/830,723

(22) Filed: Jul. 6, 2010

(65) Prior Publication Data

US 2011/0012038 A1    Jan. 20, 2011

(30) Foreign Application Priority Data

Jul. 17, 2009    (CN) .......................... 2009 1 0089403

(51) Int. Cl.
*F16K 31/02* (2006.01)

(52) U.S. Cl.
USPC ...................................... 251/129.11; 251/264

(58) Field of Classification Search
USPC ............... 251/129.11, 264, 266, 274, 276
See application file for complete search history.

(56) References Cited

U.S. PATENT DOCUMENTS

| | | | | | |
|---|---|---|---|---|---|
| 5,634,390 | A | * | 6/1997 | Takeuchi et al. | ................... 92/33 |
| 5,722,460 | A | * | 3/1998 | Olsen et al. | ............. 137/625.65 |
| 6,220,571 | B1 | * | 4/2001 | Kim et al. | ...................... 251/284 |
| 2006/0043325 | A1 | | 3/2006 | Umezawa et al. | ....... 251/129.11 |
| 2006/0261302 | A1 | * | 11/2006 | Inoue et al. | ............. 251/129.11 |
| 2006/0273272 | A1 | * | 12/2006 | Uchida et al. | ............ 251/129.11 |

FOREIGN PATENT DOCUMENTS

| | | |
|---|---|---|
| CN | 1865740 A | 11/2006 |
| CN | 101149118 A | 3/2008 |
| EP | 1 724 460 A1 | 11/2006 |
| EP | 1 806 550 A2 | 7/2007 |
| JP | 7127757 A | 5/1995 |
| JP | 10030744 A | 2/1998 |
| JP | 10220614 A | 8/1998 |
| JP | 2000120885 A | 4/2000 |
| JP | 2005291223 A | 10/2005 |
| JP | 2006097892 A | 4/2006 |
| JP | 2006348962 A | 12/2006 |
| JP | 2008032215 A | 2/2008 |
| WO | WO 2004003414 A1 | 1/2004 |

OTHER PUBLICATIONS

European Search Report and European Search Opinion dated Mar. 31, 2011 from corresponding European Application 10167923.

* cited by examiner

*Primary Examiner* — John K Fristoe, Jr.
*Assistant Examiner* — Umashankar Venkatesan
(74) *Attorney, Agent, or Firm* — Wolf, Greenfield & Sacks, P.C.

(57) ABSTRACT

Embodiments of the invention provide an electronic expansion valve, including a magnetic rotor and a screw rod, and further including an output shaft. The magnetic rotor is surroundingly provided on the output shaft, and the output shaft is slidably connected to the screw rod in an axial direction and drivably connected to the screw rod in a circumferential direction. Since the output shaft is slidably connected to the screw rod in an axial direction and drivably connected to the screw rod in a circumferential direction, the magnetic rotor does not subject to an axial force transmitted by the screw rod and rotates flexibly.

16 Claims, 3 Drawing Sheets

ELECTRONIC EXPANSION VALVE

CROSS-REFERENCES TO RELATED APPLICATIONS

This application claims the benefit of priority to Chinese Application No. 200910089403.7 filed on Jul. 17, 2009.

FIELD OF THE INVENTION

Embodiments of the present invention relate to a valve, in particular to an electronic expansion valve.

BACKGROUND OF THE INVENTION

Conventional electronic expansion valve makes use of the principle of a step-motor, in which a magnetic rotor member is driven by a coil to rotate in a forward direction and a reversed direction and a rotation movement of the magnetic rotor member is transformed into an up-and-down movement of a screw rod. A valve needle which is connected to and driven by the screw rod moves up and down to control the amount of flow of the electronic expansion valve.

In the prior art, a stop rod, a slip ring and a spring rail are all arranged outside the magnetic rotor and thus the electronic expansion valve is bulky. Besides, the magnetic rotor and the screw rod are fixedly connected together by injection molding. In use, two technical solutions are typically adopted: i) the magnet moves with the screw rod; however, the relative position between the magnet and the coil will change during the movement, thereby having an influence on the full play of the magnetic performance; ii) an axial movement limiting mechanism is additionally provided for the magnet, therefore the magnet rotor will subject to two forces simultaneously, i.e. a downward spring pushing force for positioning which is generated by a positioning spring and a downward axial force transmitted from the valve needle by the screw rod; as a result, the friction resistance against the magnetic rotor becomes large, the magnetic rotor becomes deteriorated in flexibility and tends to be jammed. In addition, the demand on the accuracy of coaxiality is increased during manufacturing of the magnetic rotor.

Japan patent publication No. JP2006348962 discloses an electronic expansion valve in which the stop rod, the slip ring and the spring rail, etc are arranged inside the magnetic rotor. However, the electronic expansion valve has the following disadvantages. Since the magnetic rotor and the screw rod are fixedly connected in an axial direction so that the magnetic rotor still subjects to a downward axial force transmitted from the valve needle by the screw rod, the magnetic rotor is poor in flexibility. Furthermore, since the stop rod is integrally formed with the magnetic rotor by injection molding, magnetic powder on the magnetic rotor will easily drop off during the course of stopping moving, and the matching margin between the stop rod and the slip ring is small. In addition, since the slip ring and the spring rail are mounted at the cylindrical portion protruding from a valve seat which is formed by stretching process, it is very difficult to guarantee the coaxiality of the cylindrical portion protruding from the valve seat. Besides, the core of valve seat consumes too much material and tends to make noise.

SUMMARY OF THE INVENTION

Embodiments of the invention provide an electronic expansion valve, which enables a magnetic rotor not subject to an axial force and rotate more flexibly.

Embodiments of the invention provide an electronic expansion valve including a magnetic rotor and a screw rod. The electronic expansion valve further includes an output shaft on which the magnetic rotor is surroundingly provided, the output shaft being slidably connected to the screw rod in an axial direction and drivably connected to the screw rod in a circumferential direction.

It can be known from the above technical solution that, the electronic expansion valve according to the embodiments of the invention enables the magnetic rotor not subject to an axial force transmitted by the screw rod and rotate flexibly due to the fact that the output shaft is slidably connected to the screw rod in the axial direction and drivably connected to the screw rod in the circumferential direction.

DETAILED DESCRIPTION OF THE INVENTION

Figure 1:
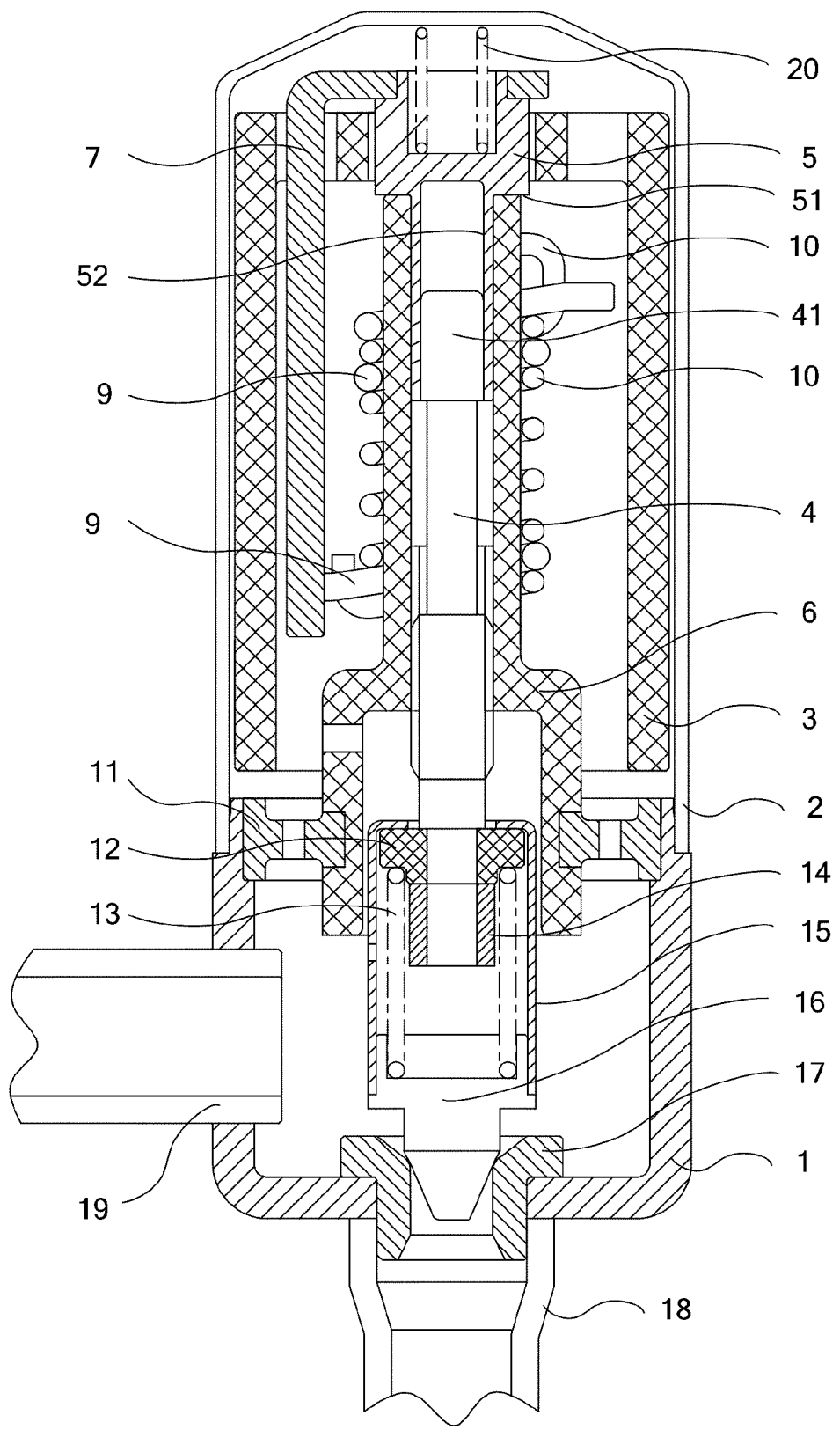
FIG. 1 is a schematic structural view of the electronic expansion valve according to a second embodiment of the invention.

The invention will be described hereinafter in detail by way of specific embodiments and in conjunction with the drawings.

First Embodiment

The embodiment of the invention provides an electronic expansion valve including a magnetic rotor and a screw rod. The electronic expansion valve further includes an output shaft on which the magnetic rotor is surroundingly provided. The output shaft is slidably connected to the screw rod in an axial direction and drivably connected to the screw rod in the circumferential direction.

There are several connecting manners between the output shaft and the screw rod. In the first manner, a non-circular hole is provided at the lower end of the output shaft or at the upper end of the screw rod, and a post corresponding to the hole is provided at the upper end of the screw rod or at the lower end of the output shaft, the post being inserted into the hole. In the first manner, if the diameter of the lower end of the output shaft is larger than that of the upper end of the screw rod, the non-circular hole is provided at the lower end of the output shaft and the post corresponding to the hole is provided at the upper end of the screw rod with the post inserted into the hold. In use, the magnetic rotor drives the output shaft to rotate, and the output shaft drives the screw rod to rotate since the post at the upper end of the screw rod is inserted into the non-circular hole at the lower end of the output shaft. The screw rod will move in the axial direction by cooperation with a nut during the course of rotation, and the post at the upper end of the screw rod can slide freely in the non-circular hold at the lower end of the output shaft without transmitting the axial force to the output shaft. Therefore, the magnetic rotor will not move in the axial direction and will only carry out a rotation movement. On the contrary, if the diameter of the lower end of the output shaft is smaller than that of the upper end of the screw rod, the non-circular hole is provided at the upper end of the screw rod and the post corresponding to the hole is provided at the lower end of the output shaft. Alternatively, in the second manner, a sliding groove is provided at the lower end of the output shaft or at the upper end of the screw rod, and a sliding block corresponding to the sliding groove is provided at the upper end of the screw rod or at the lower end of the output shaft, the sliding block being inserted into the sliding groove. In the second manner, if the diameter of the lower end of the output shaft is larger than that of the upper end of the screw rod, the sliding groove is provided at the lower end of the output shaft and the sliding block corresponding to the sliding groove is provided at the upper end of the screw rod with the sliding block inserted into the sliding groove; on the contrary, if the diameter of the lower end of the output shaft is smaller than that of the upper end of the screw rod, the sliding groove is provided at the upper end of the screw rod and the sliding block corresponding to the sliding groove is provided at the lower end of the output shaft. The operation of the output shaft and the screw rod in the second manner is the same as that in the first manner and the description thereof is thus omitted. Alternatively, in the third manner, a key groove is provided in the hole at the lower end of the output shaft or at the upper end of the screw rod, and a key corresponding to the key groove is fixedly provided at the upper end of the screw rod or at the lower end of the output shaft, the key being in clearance fit with the key groove. In the third manner, if the diameter of the lower end of the output shaft is larger than that of the upper end of the screw rod, the key groove is provided in a hole at the lower end of the output shaft and the key corresponding to the key groove is fixedly provided at the upper end of the screw rod with the key inserted into the key groove; on the contrary, if the diameter of the lower end of the output shaft is smaller than that of the upper end of the screw rod, the key groove is provided in the hole at the upper end of the screw rod and the key corresponding to the key groove is fixedly provided at the lower end of the output shaft.

The electronic expansion valve according to the first embodiment of the invention, in which the magnetic rotor is fixedly connected to the output shaft and the output shaft is slidably connected to the screw rod in the axial direction and drivably connected to the screw rod in the circumferential direction, enables the screw rod move relative to the output shaft in the axial direction because of a slidable connecting between the output shaft and the screw rod in the axial direction when the valve needle connected to the screw rod is moved slightly upwardly under the action of a pressure force. Accordingly, only a torque, rather than an axial force, is transmitted between the output shaft and the screw rod so as to separate the magnetic rotor from the screw rod. Therefore, the magnetic rotor does not subject to an axial force transmitted by the screw rod so that the flexibility of the magnetic rotor is enhanced and the stability of the electronic expansion valve is improved.

Based on the above technical solution, the electronic expansion valve can further includes a nut provided inside the magnetic rotor and a stop rod fixedly provided at the upper portion of the output shaft. The nut is drivably connected with the thread of the screw rod and a spring rail is surroundingly provided at the outside of the nut. A slip ring is slidably disposed on the spring rail. The stop rod passes through a through hole provided in the rotary end face of the magnetic rotor and extends inside the magnetic rotor to be in contact with the slip ring.

By arranging the nut inside the magnetic rotor and arranging the spring rail at the outside of the nut, the installation between the spring rail and the slip ring becomes more firm. Meanwhile, the structure of the electronic expansion valve is simplified and the assembly is made more convenient. Also, the length of the electronic expansion valve is shortened and a miniaturization of the electronic expansion valve is realized. At the meantime, since the stop rod is fixed on the output shaft and extends inside the magnetic rotor through the through hole provided in the rotary end face of the magnetic rotor so as to separate the magnetic rotor from the stop rod, the installation of the stop rod is facilitated. Beside, magnetic powder on the magnetic rotor is prevented from dropping off in case of impact action, and the reliability of the stop rod is improved.

Based on the above technical solution, the electronic expansion valve may also further include a valve seat core which is a boss provided with a through hole at the central portion thereof. Two ports of the through hole are chamfered, respectively. A head portion of the valve seat core passes through a through hole in the valve seat of the electronic expansion valve and is fixedly connected to a fluid inflow conduit of the electronic expansion valve. The valve needle of the electronic expansion valve is fitted correspondingly with the port at the base end of the valve seat core.

During the operating of the electronic expansion valve, the opening and closing actions of the valve needle control the amount of flow of the fluid flowing through the electronic expansion valve. When the valve needle is opened, fluid inflowing from the fluid inflow conduit will generate noise due to a sudden variation in the section area through which the fluid flows. By providing the valve seat core for connecting the valve seat and the fluid inflow conduit, and chamfering the two ports of the through hole of the valve seat core respectively, the fluid inflow conduit is easily communicated with the valve seat. Since the through hole of the valve seat core is chamfered, a smooth transition can be realized in the section through which the fluid flows, thereby eliminating noise.

Second Embodiment

Figure 2:
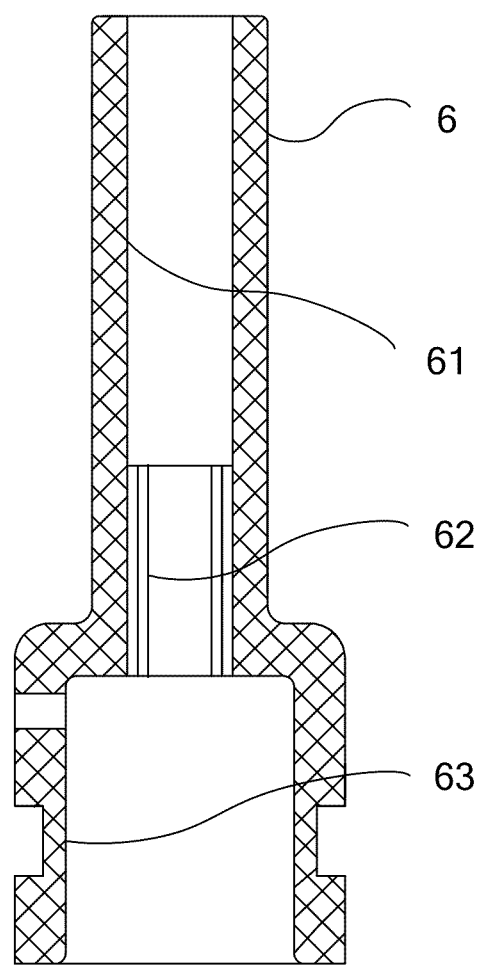
FIG. 2 is a schematic structural view of the nut in the electronic expansion valve according to a second embodiment of the invention.

FIG. 1 is a schematic structural view of the electronic expansion valve according to a second embodiment of the invention, and FIG. 2 is a schematic structural view of the nut in the electronic expansion valve according to the second embodiment of the invention. As shown in FIGS. 1 and 2, the second embodiment of the invention is based on the first embodiment described above. The difference between the two embodiments lies in that, the electronic expansion valve according to the second embodiment can further include a nut positioning seat 11 fixedly provided on a valve seat 1 of the electronic expansion valve. The nut 6 is of a cylindrical shape, the lower portion of the nut 6 is fixedly provided on the nut positioning seat 11. The spring rail 10, on which the slip ring 9 is slidably provided, is surroundingly provided on the cylindrical surface of the upper portion of the nut 6. A first guiding section 61 and an internal thread section 62 are arranged inside the nut 6 in sequence. The lower end of the output shaft 5 is inserted in the first guiding section 61, and the top end of the nut 6 abuts against the support surface of the output shaft 5. The internal thread section 62 is drivably connected with the thread of the screw rod 4.

The invention will be further explained by way of the second embodiment of the invention in which for example the diameter of the lower end of the output shaft 5 is larger than that of the upper end of the screw rod 4. The lower end of the output shaft 5 is inserted in the first guiding section 61 and the screw rod 4 is inserted into the output shaft 5. During operation, the first guiding section 61 servers to guide and position the output shaft 5 so that the output shaft 5 can rotate inside the first guiding section 61 without deflection. The top end of the nut 6 abuts against the support surface 51 of the output shaft 5. When the magnetic rotor 3 is rotated, the output shaft 5 is able to rotate relative to the nut 6 so that the nut 6 supports the output shaft 5. The internal thread section 62 of the nut 6 is drivably connected with the thread of the screw rod 4 so that during the rotation of the screw rod 4, the thread of the screw rod 4 engages with the internal thread section 62 of the nut 6 so as to move the screw rod 4 back and forth in the axial direction.

In addition, if the diameter of the lower end of the output shaft 5 is smaller than that of the upper end of the screw rod 4, the upper end of the screw rod 4 is inserted in the first guiding section 61 and the output shaft 5 is inserted into the screw rod 4. Since the first guiding section 61 may guide and position the screw rod 4, the output shaft 5 inserted into the screw rod 4 may be guided and positioned (not shown). This technical solution is also within the scope of protection of the invention and is readily envisaged by those skilled in the art.

Specifically, a valve seat 1 and a valve housing 2 are fixedly connected together to form the valve body of the electronic expansion valve. A coil (not shown) is provided at the outside of the valve body. A fluid inflow conduit 18 and a fluid outflow conduit 19 are installed on the valve seat 1. When being energized, the coil will drive the magnetic rotor 3 provided inside the valve body to rotate. The magnetic rotor 3 is fixedly connected to the output shaft 5 which is slidably connected to the screw rod 4 in axial direction and drivably connected to the screw rod 4 in circumferential direction. For example, in the second embodiment of the invention, a non-circular hole 52 may be provided at the lower end of the output shaft 5, and a post 41 corresponding to the hole 52 may be provided at the upper end of the screw rod 4. The post 41 may be inserted into the hole 52 so that the output shaft 5 and the screw rod 4 are slidably connected in the axial direction and drivably connected in the circumferential direction. A stop rod 7 is fixedly provided on the output shaft 5 and extends into the inside of the magnetic rotor 3 through the through hole provided in the rotary end face of the magnetic rotor 3 so as to be in contact with a slip ring 9. The nut 6 is arranged inside the magnetic rotor 3 and can be of a cylindrical shape. The lower portion of the nut 6 is fixedly arranged on the nut positioning seat 11 and the nut positioning seat 11 for fixing the nut 6 is fixedly arranged on the valve seat 1, so as to fix the nut 6 in the electronic expansion valve. A spring rail 10 is provided around the cylindrical surface of the upper portion of the nut 6, and in turn, a slip ring 9 is slidably provided on the spring rail 10. Thus, by the cooperation between the stop rod 7 and the slip ring 9 the rotation range of the magnetic rotor 3 is controlled. Specifically, when the magnetic rotor 3 is rotated, the stop rod 7 will be driven to rotate with the rotation of the magnetic rotor 3 and the stop rod 7 will drive the slip ring 9 to rotate on the spring rail 10. Since the spring rail 10 has a certain length, when the slip ring 9 rotates on the spring rail 10 to the top (bottom), the slip ring 9 will no longer rotate due to a restriction at the end of the spring rail 10, whereby the magnetic rotor 3 will stop rotating accordingly. Thus, the rotation range of the magnetic rotor 3 is controlled. Inside the nut 6, a first guiding section 61 and an internal thread section 62 are arranged downwardly in sequence. The lower end of the output shaft 5 is inserted in the first guiding section 61, and the top end of the nut 6 abuts against the support surface 51 of the output shaft 5. When the magnetic rotor 3 is rotated, the output shaft 5 is able to rotate relative to the nut 6. Since the support surface 51 of the output shaft 5 is supported by the top end of the first guiding section 61 of the nut band the shaft body at the lower end of the output shaft 5 may freely rotate inside the first guiding section 61, the output shaft 5 is positioned and supported. Besides, the internal thread section 62 is drivably connected with the thread of the screw rod 4 so that when the screw rod 4 is driven to rotate by the magnetic rotor 3, the thread on the screw rod 4 rotates inside the internal thread section 62 to achieve an axial movement of the screw rod 4.

By arranging the nut positioning seat such that the nut is fixed on the valve seat and providing the spring rail and the slip ring on the nut, the electronic expansion valve according to the second embodiment of the invention improves the stability thereof and facilitates the machining and assembly thereof due to a high coaxiality of the outer surface of the nut. Since the output shaft is positioned by a nut, a better fixing and positioning effect can be achieved. In addition, due to a high coaxiality of the nut, the magnetic rotor fixedly provided on the output shaft can be prevented from deflecting sideward during rotating whereby the collision or friction between the magnetic rotor and the valve housing is avoided. In this regard, the clearance between the magnetic rotor and the valve housing may be smaller. Accordingly, the operating distance of the electromagnetic operation is reduced and the driving force becomes bigger. In addition, since the diameter of the output shaft is smaller than that of the magnetic rotor, the resistant torque thereof becomes smaller under the same resistance force so that driving performance is effectively improved. The thread of the nut is provided at the middle portion of the nut so as to prevent foreign impurities from being introduced. Therefore, the possibility of jamming is reduced during use, and the reliability of the electronic expansion valve is improved. Meanwhile, the nut can be manufactured in mass production and a high coaxiality is ensured. The difficulty in machining is lowered and the machining efficiency is improved.

Still further, a second guiding section 63 may be provided inside the nut 6. The second guiding section 63 is located under the internal thread section 62. The electronic expansion valve may further include: a friction reducing member 12 fixedly provided at the lower portion of the screw rod 4; a valve needle connecting cap 15 provided inside the second guiding section 63. The interior surface of the upper portion of the valve needle connecting cap 15 abuts against the outside of the friction reducing member 12, and the lower portion of the valve needle connecting cap 15 is fixedly connected to the valve needle 16 of the electronic expansion valve. A valve needle spring 13 is provided inside the valve needle connecting cap 15, the upper end of the valve needle spring 13 contacts with the friction reducing member 12 and the lower end of the valve needle spring 13 contacts with the valve needle 16.

By providing a friction reducing member and a valve needle connecting cap to realize a connection between the screw rod and the valve needle, the friction force can be reduced since the friction reducing member contacts with the valve needle connecting cap and the valve needle spring during the rotation of the screw rod, thereby ensuring a flexible rotating of the screw rod. Meanwhile, the valve needle connecting cap is fixedly connected with the friction reducing member in the axial direction so that the valve needle will not rotate with the screw rod and will only move axially.

In addition, the electronic expansion valve can further include a positioning spring 20 whose upper portion contacts with the top end of the valve housing 2 of the electronic expansion valve. A recess is provided in the upper portion of the output shaft 5. The lower portion of the positioning spring 20 is inserted into the recess so as to be in contact with the output shaft 5. By providing the positioning spring 20, the output shaft 5 is restricted by a spring force of the positioning spring 20 and is prevented from moving axially.

Third Embodiment

Figure 3:
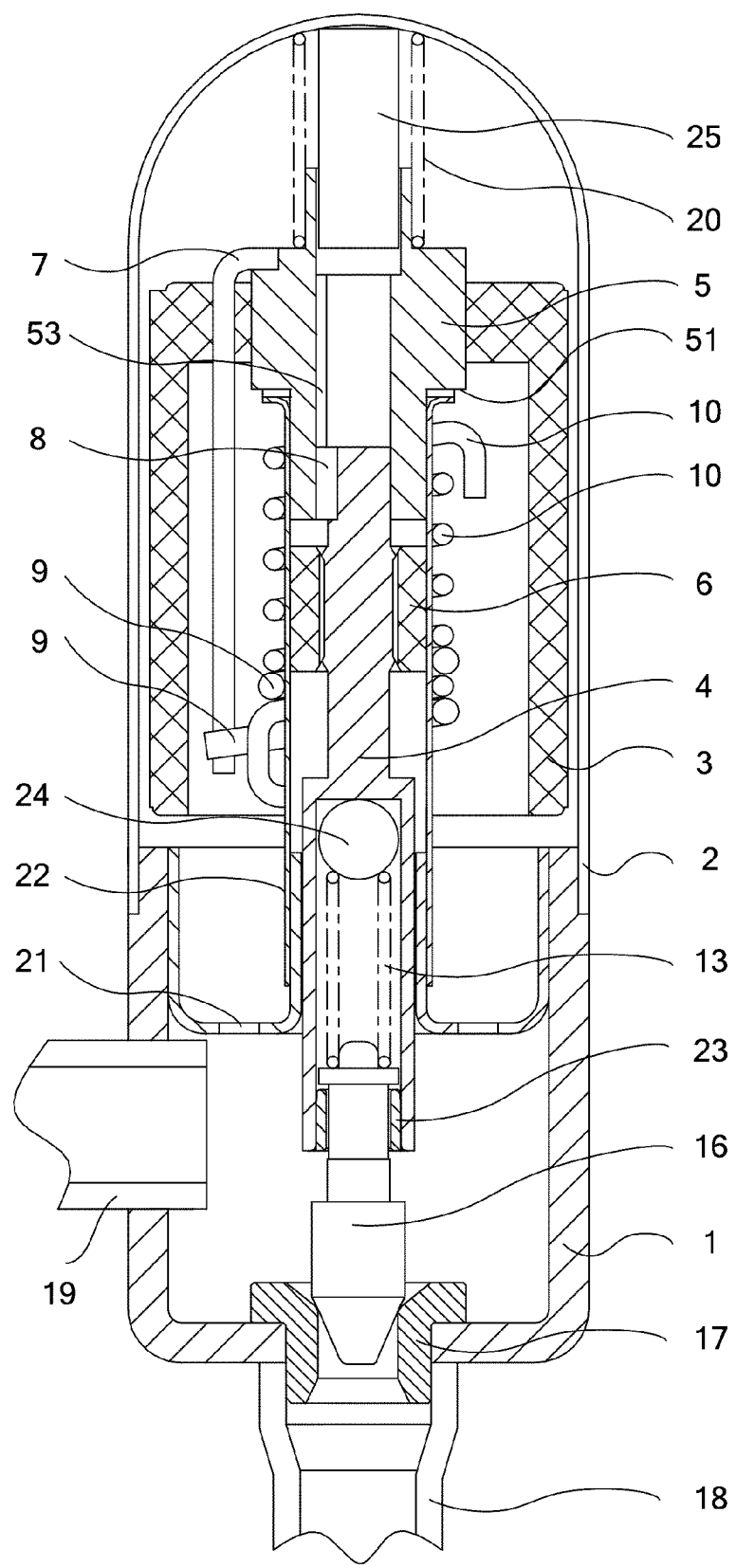
FIG. 3 is a schematic structural view of the electronic expansion valve according to a third embodiment of the invention.

FIG. 3 is a schematic structural view of the electronic expansion valve according to a third embodiment of the invention. As shown in FIG. 3, the third embodiment of the invention is based on the first embodiment described above. The difference between the first and third embodiments lies in that the electronic expansion valve according to the third embodiment further includes: a support seat 21 fixedly provided on the valve seat 1 of the electronic expansion valve and a support sleeve 22 arranged between the nut 6 and the spring rail 10. The lower portion of the support sleeve 22 is fixedly provided on the support seat 21. The nut 6 is fixedly provided inside the support sleeve 22. The spring rail 10 on which a slip ring 9 is slidably provided is surroundingly provided on the outer surface of the support sleeve 22. The lower end of the output shaft 5 is inserted in the upper portion of the support sleeve 22. The top end of the support sleeve 22 abuts against the support surface 51 of the output shaft 5. The nut 6 is drivably connected with the thread of the screw rod 4.

The invention will be further explained by way of the third embodiment of the invention in which for example the diameter of the lower end of the output shaft 5 is larger than that of the upper end of the screw rod 4. The lower end of the output shaft 5 is inserted in the upper portion of the support sleeve 22 and the screw rod 4 is inserted into the output shaft 5. During operation, the support sleeve 22 servers to guide and position the output shaft 5 so that the output shaft 5 can rotate in the upper portion of the support sleeve 22 without deflection. The top end of the support sleeve 22 abuts against the support surface 51 of the output shaft 5. When the magnetic rotor 3 is rotated, the output shaft 5 is able to rotate relative to the support sleeve 22 so that the output shaft 5 is supported by the support sleeve 22. The nut 6 is drivably connected with the thread of the screw rod 4 so that during the rotation of the screw rod 4, the thread of the screw rod 4 engages the thread of the nut 6 so as to move the screw rod 4 back and forth in the axial direction.

In addition, when the diameter of the lower end of the output shaft 5 is smaller than that of the upper end of the screw rod 4, the upper end of the screw rod 4 is inserted in the upper portion of the support sleeve 22 and the output shaft 5 is inserted into the screw rod 4. Since the support sleeve 22 may guide and position the screw rod 4, the output shaft 5 inserted into the screw rod 4 may be guided and positioned (not shown). This technical solution is also within the scope of protection of the invention and is readily envisaged by those skilled in the art.

Specifically, the connecting manners with regard to the valve seat 1, the valve housing 2, the magnetic rotor 3 and the stop rod 7, etc are the same as those in the second embodiment and the description thereof are thus omitted. In this embodiment, the support sleeve 22 is arranged between the nut 6 and the spring rail 10. The lower portion of the support sleeve 22 is fixedly provided on the support seat 21 and the support seat 21 is fixedly provided on the valve seat 1, thereby fixing the support sleeve 22 in the electronic expansion valve. The output shaft 5 is slidably connected to the screw rod 4 in the axial direction and drivably connected to the screw rod 4 in the circumferential direction. For example, in the third embodiment of the invention, a key groove 53 may be provided in the hole at the lower end of the output shaft 5 and a key 8 may be fixedly provided at the upper end of the screw rod 4. The key 8 fixedly provided at the upper end of the screw rod 4 is inserted into the key groove 53 in the hole at the lower end of the output shaft 5. The output shaft 5 and the screw rod 4 are axially slidably connected through the key 8, and the screw rod 4 in the hole at the lower end of the output shaft 5 can move in the axial direction. A shaft body at lower end of the output shaft 5 is inserted into a sleeve body at the upper portion of the support sleeve 22 and the top end of the support sleeve 22 abuts against the support surface 51 of the output shaft 5. When the magnetic rotor 3 is rotated, the output shaft 5 is able to rotate relative to the support sleeve 22. Since the support surface 51 of the output shaft 5 is supported by the top portion of the support sleeve 22 and the shaft body at the lower end of the output shaft 5 may freely rotate inside the sleeve body of the support sleeve 22, the output shaft 5 is positioned and supported. The nut 6 is fixedly provided inside the support sleeve 22 and the thread of the nut 6 is drivably connected with the thread of the screw rod 4. The spring rail 10 is surroundingly provided at the outside of the support sleeve 22 and a slip ring 9 is slidably provided on the spring rail 10 so that the rotation range of the magnetic rotor 3 is controlled by the cooperation between the stop rod 7 and the slip ring 9.

By providing the support seat for supporting and fixing the support sleeve and the support sleeve for positioning the output shaft, the electronic expansion valve according to the third embodiment of the invention can provide better supporting and fixing effect. In addition, due to a high coaxiality of the support sleeve, the magnetic rotor fixedly provided on the output shaft can be prevented from deflecting sideward during rotating, whereby the collision or friction between the magnetic rotor and the valve housing is avoided. In this regard, the clearance between the magnetic rotor and the valve housing may be smaller. Accordingly, the operating distance of the electromagnetic operation is reduced and the driving force becomes bigger. In addition, since the diameter of the output shaft is smaller than that of the magnetic rotor, the resistant torque thereof becomes smaller under the same resistance force so that driving performance is effectively improved. The spring rail and the slip ring are provided around the support sleeve. The electronic expansion valve improves the stability thereof and facilitates the machining and assembly thereof due to a high coaxiality of the outer surface of the support sleeve. The nut is provided inside the support sleeve so as to prevent foreign impurities from being introduced. Therefore, the possibility of jamming is reduced during use, and the reliability of the electronic expansion valve is improved. Meanwhile, the support sleeve can be manufactured in mass production and a high coaxiality is ensured. The difficulty in machining is lowered and the machining efficiency is improved.

Still further, the electronic expansion valve may include a valve needle sleeve 23 which fixedly connects the screw rod 4 with the valve needle 16 of the electronic expansion valve in the axial direction. A cylindrical hole is provided at the connecting end of the screw rod 4 with the valve needle 16. A steel ball 24 and a valve needle spring 13 are provided inside the cylindrical hold in sequence. The valve needle spring 13 is in contact with the valve needle 16. The valve needle sleeve 23 is fixedly provided at the port of the cylindrical hole to fixedly connect the screw rod 4 with the valve needle 16 in axial direction.

By arranging the valve needle sleeve to fixedly connect the screw rod with the valve needle in the axial direction, it can be ensured that the valve needle will not rotate with the screw rod and will only move axially. By arranging a steel ball inside the cylindrical hole of the screw rod, the friction force can be reduced and the screw rod will rotate flexibly.

In addition, the electronic expansion valve may further include a spindle 25 whose upper portion is fixedly provided at the top end of the valve housing 2 of the electronic expansion valve; and a positioning spring 20 surroundingly provided at the outside of the spindle 25, the upper portion thereof being in contact with the upper end of the valve housing 2 and the lower portion thereof being in contact with the output shaft 5; a projecting recess provided at the upper portion of the output shaft 5. The lower portion of the spindle 25 is inserted into the recess to be slidably connected to the output shaft 5. The positioning spring 20 is surroundingly provided at the outside of the recess. By providing the spindle 25 and inserting the spindle 25 into the recess of the output shaft 5, the output shaft 5 is further positioned. By providing the positioning spring 20, the output shaft 5 is restricted by a spring force of the positioning spring 20 and is prevented from moving axially.

Finally, it is should be noted that the embodiments described above are only used for illustrating the technical solutions of the invention and are not intended to limit the invention. While the invention has been described in detail with reference to the preceding embodiments, it is understood by those with ordinary skills in the art that the technical solutions disclosed in the preceding embodiments can be modified, or some technical features thereof can be replaced by equivalents; those modifications or replacements will not depart from the spirit and scope of the technical solution defined by the appended claims.

What is claimed is:

1. An electronic expansion valve, comprising
a magnetic rotor;
a screw rod;
an output shaft on which the magnetic rotor is surroundingly provided; and
a nut provided inside the magnetic rotor; wherein:
the nut comprises a first guiding section and an internal thread section,
a top end of the nut abuts against a support surface of the output shaft,
the internal thread section of the nut is drivably connected with a thread of the screw rod, and
a lower end of the output shaft is inserted into the first guiding section of the nut and is connected to an upper end of the screw rod such that the output shaft is slidably connected to the screw rod in an axial direction and drivably connected to the screw rod in a circumferential direction.

2. The electronic expansion valve according to claim 1, wherein:
a non-circular hole is provided at the lower end of the output shaft or at the upper end of the screw rod, and a post corresponding to the hole is provided at the upper end of the screw rod or at the lower end of the output shaft, the post being inserted into the hole; or
a key groove is provide in a hole at the lower end of the output shaft or at the upper end of the screw rod, and a key is fixedly provided at the upper end of the screw rod or at the lower end of the output shaft, the key being in clearance fit with the key groove.

3. The electronic expansion valve according to claim 1, further comprising:
a spring rail provided at the outside of the nut, and a slip ring slidably provided on the spring rail; and
a stop rod fixedly provided at an upper portion of the output shaft, wherein the stop rod passes through a through hole provided in a rotary end face of the magnetic rotor and extends inside the magnetic rotor to be in contact with the slip ring.

4. The electronic expansion valve according to claim 3, further comprising:
a nut positioning seat fixedly provided on a seat valve of the electronic expansion valve;
wherein the nut is of a cylindrical shape, a lower portion of the nut is fixedly provided on the nut positioning seat, and the spring rail, on which the slip ring is slidably provided, is surroundingly provided on a cylindrical surface of an upper portion of the nut.

5. The electronic expansion valve according to claim 4, wherein
a second guiding section is provided inside the nut, the second guiding section being located under the internal thread section, the electronic expansion valve further comprising:
a friction reducing member fixedly provided at a lower portion of the screw rod;
a valve needle connecting cap provided inside the second guiding section, an internal surface of an upper portion of the valve needle connecting cap abutting against a outside surface of the friction reducing member, and a lower portion of the valve needle connecting cap fixedly connected to a valve needle of the electronic expansion valve;
a valve needle spring provided inside the valve needle connecting cap, an upper end of the valve needle spring contacting with the friction reducing member, and an lower end of the valve spring contacting the valve needle.

6. The electronic expansion valve according to claim 1, further comprising:
a valve seat core which is a boss provided with a through hole at a central portion thereof, two ports of the through hole of the valve seat core being chamfered, respectively;
wherein a head portion of the valve seat core passes through a through hole of a valve seat of the electronic expansion valve and is fixedly connected to a fluid inflow conduit of the electronic expansion valve, a valve needle of the electronic expansion valve is fitted correspondingly with the port at a base end of the valve seat core.

7. The electronic expansion valve according to claim 2, further comprising:
a positioning spring, an upper portion of the positioning spring contacting a top end of a valve housing of the electronic expansion valve;
wherein a recess is provided at an upper portion of the output shaft, and a lower portion of the positioning spring is inserted in the recess so as to be in contact with the output shaft.

8. The electronic expansion valve according to claim 3, further comprising:
a spindle, an upper portion of the spindle being fixedly provided at a top end of a valve housing of the electronic expansion valve;
a positioning spring surroundingly provided at the outside of the spindle, an upper portion of the positioning spring contacting the top end of the valve housing, and an lower portion of the positioning spring contacting the output shaft;
wherein a projecting recess is provided at the upper portion of the output shaft, an lower portion of the spindle is inserted in the recess to be slidably connected to the output shaft, and the positioning spring is surroundingly provided at the outside of the recess.

9. The electronic expansion valve according to claim 4, further comprising:
a positioning spring, an upper portion of the positioning spring contacting a top end of a valve housing of the electronic expansion valve;
wherein a recess is provided at an upper portion of the output shaft, and a lower portion of the positioning spring is inserted in the recess so as to be in contact with the output shaft.

10. An electronic expansion valve, comprising:
a magnetic rotor;
a screw rod;
an output shaft on which the magnetic rotor is surroundingly provided;
a nut provided inside the magnetic rotor; and
a support sleeve; wherein:
the nut is fixedly provided inside the support sleeve,
a top end of the support sleeve abuts against a support surface of the output shaft,
the nut is drivably connected with a thread of the screw rod, and
a lower end of the output shaft is inserted in an upper portion of the support sleeve and is connected to an upper end of the screw rod such that the output shaft is slidably connected to the screw rod in an axial direction and drivably connected to the screw rod in a circumferential direction.

11. The electronic expansion valve according to claim 10, wherein:
a non-circular hole is provided at the lower end of the output shaft or at the upper end of the screw rod, and a post corresponding to the hole is provided at the upper end of the screw rod or at the lower end of the output shaft, the post being inserted into the hole; or
a key groove is provide in a hole at the lower end of the output shaft or at the upper end of the screw rod, and a key is fixedly provided at the upper end of the screw rod or at the lower end of the output shaft, the key being in clearance fit with the key groove.

12. The electronic expansion valve according to claim 10, further comprising:
a support seat fixedly provided on a valve seat of the electronic expansion valve, and a lower portion of the support sleeve is fixedly provided on the support seat;
a spring rail surroundingly provided over an outer surface of the support sleeve, and a slip ring is slidably provided on the spring rail; and
a stop rod fixedly provided at an upper portion of the output shaft, wherein the stop rod passes through a through hole provided in a rotary end face of the magnetic rotor and extends inside the magnetic rotor to be in contact with the slip ring.

13. The electronic expansion valve according to claim 12, further comprising:
a valve needle sleeve for fixedly connecting the screw rod with the valve needle of the electronic expansion valve in the axial direction;
wherein a cylindrical hole is provided at a connecting end of the screw rod with the valve needle, a steel ball and a valve spring are arranged in the cylindrical hole in sequence, the valve spring is in contact with the valve needle; and
wherein the valve needle sleeve is fixedly provided at a port of the cylindrical hole for fixedly connecting the screw rod with the valve needle in the axial direction.

14. The electronic expansion valve according to claim 10, further comprising:
a valve seat core which is a boss provided with a through hole at a central portion thereof, two ports of the through hole of the valve seat core being chamfered, respectively;
wherein a head portion of the valve seat core passes through a through hole of a valve seat of the electronic expansion valve and is fixedly connected to a fluid inflow conduit of the electronic expansion valve, a valve needle of the electronic expansion valve is fitted correspondingly with the port at a base end of the valve seat core.

15. The electronic expansion valve according to claim 11, further comprising:
a positioning spring, an upper portion of the positioning spring contacting a top end of a valve housing of the electronic expansion valve; wherein:
a recess is provided at an upper portion of the output shaft, and a lower portion of the positioning spring is inserted in the recess so as to be in contact with the output shaft.

16. The electronic expansion valve according to claim 12, further comprising:
a spindle, an upper portion of the spindle being fixedly provided at a top end of a valve housing of the electronic expansion valve; and
a positioning spring surroundingly provided at the outside of the spindle, an upper portion of the positioning spring contacting the top end of the valve housing, and an lower portion of the positioning spring contacting the output shaft; wherein:
a projecting recess is provided at the upper portion of the output shaft, an lower portion of the spindle is inserted in the recess to be slidably connected to the output shaft, and the positioning spring is surroundingly provided at the outside of the recess.

* * * * *